United States Patent Office 3,625,026
Patented Dec. 7, 1971

3,625,026
REMOVING DISSOLVED OXYGEN FROM MOLTEN
TIN IN A GLASS RIBBON FLOAT BATH
Alan Joseph Cocker, Ormskirk, England, assignor to
Pilkington Brothers Limited, Liverpool, England
Filed Apr. 16, 1970, Ser. No. 29,051
Claims priority, application Great Britain, Apr. 17, 1969,
19,723/69
Int. Cl. C03c 18/02
U.S. Cl. 65—27                                23 Claims

ABSTRACT OF THE DISCLOSURE

The dissolved oxygen content of a molten metal, e.g. molten tin or tin alloy, is tested and/or controlled by means of an electrolytic cell including a wall of a refractory oxide electrolyte having a substantial oxygen ion conductivity one face of which is in contact with the molten metal and the other face of which is engaged by an electrode. The cell E.M.F. indicates the oxygen content of the metal which is controlled by passage of controlled current through the cell.

BACKGROUND OF THE INVENTION

(1) Field of the invention

This invention relates to the measurement and control of the content of dissolved oxygen in molten metal.

(2) Description of the prior art

A bath of molten tin or tin alloy is used to support an advancing ribbon of glass in the float process for the manufacture of flat glass, and the molten bath may be constituted so as to have the characteristics described in U.S. Pat. No. 2,911,759.

The presence of oxygen in any appreciable quantity in the molten tin of such a bath is undesirable, particularly when the bath is used to support glass during surface treatment processes in which surface characteristics other than those inherent in the method of forming glass are imparted to the glass.

An object of the present invention is to provide a method and an apparatus whereby the content of dissolved oxygen in a molten metal may be tested and/or controlled.

SUMMARY

The invention provides for quantitative assessment and control of the dissolved oxygen content of a molten metal. An electrolytic cell with a solid state electrolyte comprising a wall of a refractory oxide which has a substantial oxygen ion conductivity is constituted, the molten metal being one electrode in contact with one surface of the wall, and another electrode being in electrical contact with the other surface of the wall. An electric current is passed through the cell so that oxygen ions pass through the wall, the magnitude and direction of the current being regulated so as to control the oxygen content of the molten metal. When the current is terminated the cell E.M.F. indicates the oxygen content of the metal.

DESCRIPTION OF THE PREFERRED EMBODIMENTS

Figure 1:
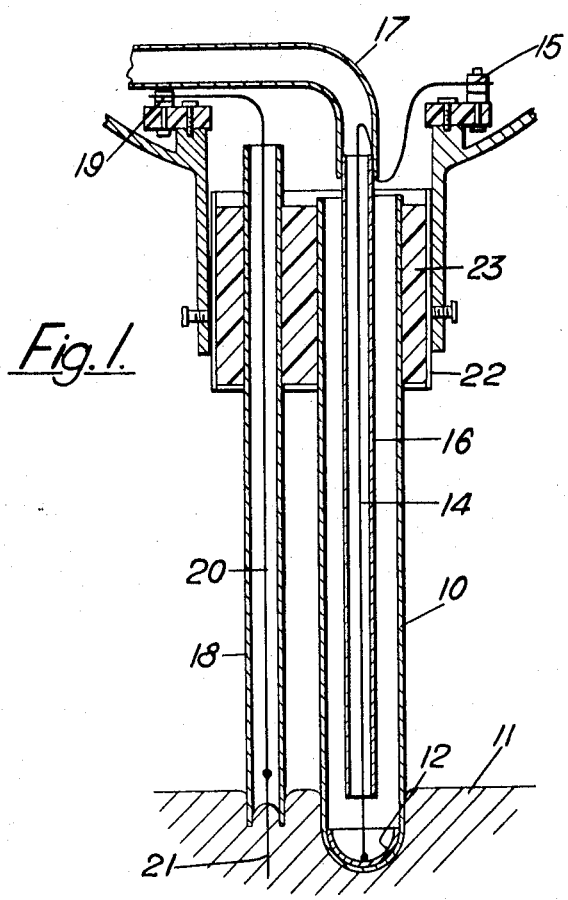
FIG. 1 is a diagrammatic axial cross-section of apparatus according to one embodiment of the invention for removing oxygen from molten tin.

Referring to FIG. 1, the apparatus shown comprises a tubular probe 10 closed at its lower end and having walls of zirconia (zirconium oxide) and thoria (thorium oxide). The closed lower end of the probe 10 is, in use of the apparatus, immersed in molten tin 11 from which dissolved oxygen is to be removed.

The positive electrode 12 comprising a layer or film of platinum is provided on the internal surface of the tubular probe 10 at its lower end. A platinum lead 14 connects the electrode 12 to a terminal 15 externally of the tubular body 10.

An internal tube 16 of heat-resistant material, such as alumina, is disposed co-axially within the tubular probe 10 and has an open lower end disposed close to the platinum electrode 12. A silicone rubber tube 17 is attached to the upper end of the tube 16 and is connected in use of the apparatus, to a source of purging gas, preferably hydrogen.

Externally of the tubular body 10 a further alumina tube 18 is arranged and encloses a platinum lead 20 which is connected at its upper end externally of the tube 18 to a terminal 19. At its lower end the lead 20 is connected to a negative electrode 21 of rhenium which projects beyond the lower end of the tube 18 and which in use of the apparatus dips into the molten tin 11. The negative electrode 21 may alternatively comprise carbon, tungsten or molybdenum.

The tubular probe 10 and the tube 18 are supported in fixed positions parallel to each other within a stainless steel sleeve 22 by means of a packing 23 of heat-resistant cement, for example a fluorspar/sodium silicate cement.

In use of the apparatus the terminal 15 is connected to the positive terminal of a direct current source (not shown) while the terminal 19 is connected to the negative terminal of said source, so that an electrolytic current flows from the electrode 12 through the wall of the tubular probe 10, into the tin 11 and to the electrode 21. In effect the solid wall of the prove 10 acts as an electrolyte, and in the course of the electrolytic action oxygen ions pass from the tin 11 through the wall of the probe 10 and are neutralised at the electrode 12. The oxygen liberated at the electrode 12 is removed by chemical combination and/or entrainment with the purging gas flowing over the electrode 12 from the tube 16.

The probe walls should have a substantial oxygen ion conductivity. A suitable alternative to zirconia is thoria (thorium oxide). The probe wall may be doped with a proportion of up to 20% of calcium oxide, magnesium oxide, or yttrium oxide. The platinum electrode 12 on the internal surface of the tubular probe 10 is preferably formed by painting or spraying a colloidal suspension of platinum on to said internal surface and then firing the resultant film to form a coherent porous layer of platinum adhering to the probe wall.

As an alternative to using a purging or reducing gas to remove the liberated oxygen, the latter may be removed by providing a carbon rod within the tubular probe 10, for example in place of the platinum lead 14, so that the liberated oxygen attacks this carbon rod, which is consumed during the use of the apparatus. The carbon rod would make electrical contact with a molten metal inside the probe 10, and the internal tube 16 could be dispensed with.

Figure 2:
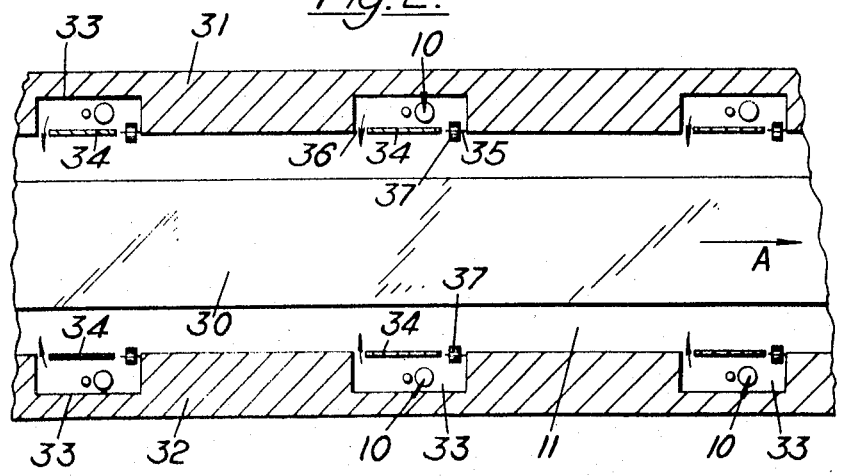
FIG. 2 is a diagrammatic plan view, partly in section, illustrating the use of apparatus such as that shown in FIG. 1 for removing oxygen from a molten tin bath supporting a glass ribbon.

FIG. 2 shows the apparatus of FIG. 1 as applied to the removal of oxygen from a bath of molten tin, for example a bath on which a ribbon 30 of glass in a semi-molten state is supported. The ribbon 30 is advanced continuously in the direction of arrow A along the surface of the tin 11 which is contained in a bath having parallel side walls 31, 32. The bath is enclosed by a roof structure (not shown) and a reducing atmosphere is maintained within this roof structure over the surface of the molten tin 11 in the bath.

Pockets 33 are provided at intervals along each of the bath side walls 31, 32 and are partly closed by partitions 34 which define entrance and exit apertures 35, 36 respectively through which the respective pockets 33 communicate with the interior of the bath at opposite longitudinal ends of the pockets 33. A small driven paddle wheel 37 is provided in each entrance aperture 35 for the purpose of circulating tin from the bath through the respective pocket 33 and returning it to the bath through the exit aperture 36.

Within each pocket 33 a number of probes 10 and associated structure as described with reference to FIG. 1 are arranged, for the purpose of removing dissolved oxygen from the tin circulated through the respective pocket 33. For simplicity of illustration only one probe 10 is shown in each pocket 33 in FIG. 2.

The arrangement shown in FIG. 2 of pockets 33 communicating with the bath may be employed in all parts of the molten tin bath down to temperatures of the order of 500° C. For example, the pockets 33 may be provided in the floor of the bath instead of in the side walls 31, 32 or in addition to the pockets in said side walls.

Figure 3:
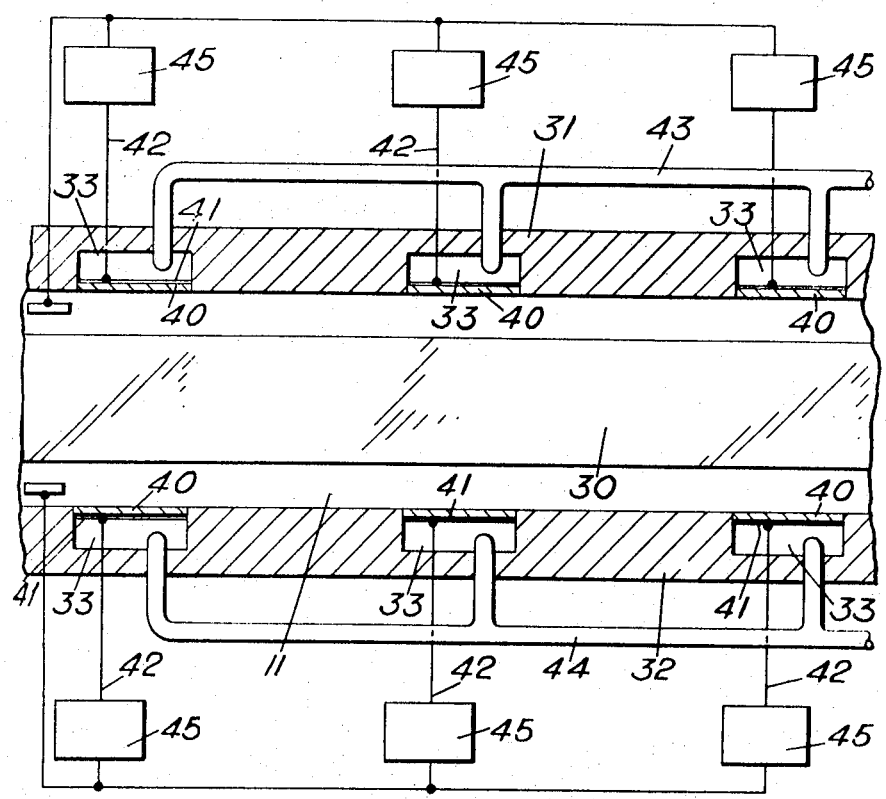
FIG. 3 is a diagrammatic plan view, also partly in section, showing a modification of the arrangement shown in FIG. 2.

FIG. 3 illustrates an alternative arrangement for removing dissolved oxygen from molten tin 11 in a bath. In this arrangement hte bath walls, again in this case the side walls 31, 32 are provided with pockets 33 which are separated from the molten tin 11 by respective walls or membranes 40 of doped zirconia or thoria which serve the same purpose as the walls of the tubular body 10 of FIG. 1. The internal surface of each wall or membrane 40, that is the surface remote from the tin 11, is provided with a positive electrode comprising a coating 41 of platinum to which electrical contact is made by way of respective leads 42.

Alternatively, the pockets 33 may contain a molten metal such as silver or tin constituting the positive electrode. A purging gas, for example hydrogen, is passed through each pocket 33 from respective manifolds 43, 44 on each side of the bath, either over the surface of the respective platinum coatings 41 or, where the pockets 33 contain molten metal, by bubbling the gas through the metal.

Instead of scavenging oxygen from the pockets 33 by means of hydrogen carbon electrodes can be disposed in the pockets 33 to make contact with molten metal therein, the metal in turn providing electrical contact with the walls or membranes 40.

The arrangement of FIG. 3 is better suited than that of FIG. 2 for use in the hotter regions of the molten tin bath.

The voltage applied between the positive and negative electrodes of each probe depends on the thickness of the respective probe wall 10 or membrane 40 and the resistance of the material (for example zirconia) of the wall or membrane, the latter being dependent on the operating temperature and the thickness of the wall or membrane. Preferably the current supplied to each probe is individually controllable by means of a respective control unit 45. Typically, the total electrolytic current flowing in use of each cell is between 5 and 50 amps.

In an alternative arrangement (not illustrated) the molten tin from the bath may be circulated through a chamber remote from the bath, said chamber containing a probe according to the invention, for example of the kind described with reference to FIG. 1. Before recirculating the molten tin from the chamber to the bath, the temperature of the tin is adjusted by suitable heating means to avoid cooling the molten tin in the bath.

When applied to the removal of oxygen from baths of molten tin used for supporting glass the present invention is particularly suitable for removing the last remaining traces of oxygen after the bulk of the oxygen has been scavenged by some other method, for example by the addition of zinc or lead to the tin of the bath.

It will be appreciated that the present invention is capable of wider application than that described with reference to the drawings. In addition to removing oxygen from molten metal, for example tin, apparatus according to the invention, such as the probe 10, may be used to control the content of dissolved oxygen in, and therefore the degree of oxidation of, a molten metal such as tin or a tin alloy containing glass colouring agents. The direction of the current passed through the wall of the probe, and the strength of the current, would be regulated so as to adjust the oxygen content of the molten metal in the desired sense and by the desired amount.

The invention can also be employed for the testing of the content of dissolved oxygen in a molten metal—for example for testing the oxygen content of molten metal in a bath so as to permit control of the degree of oxidation of the metal and thereby control of the manufacture of glass on the bath. For this purpose a probe such as the probe 10 of FIG. 1 is inserted in the molten metal to be tested and a high impedance millivoltmeter connected between the electrode 12 and the molten metal to measure the E.M.F. of the galvanic cell constituted by the wall of the probe. The cell E.M.F. E is given by:

$$E = \frac{RT}{4F} \ln \frac{a_1}{a_2}$$

where
R is the universal gas constant,
T is the absolute temperature,
F is Faraday's constant, and
$a_1$, $a_2$ are the oxygen activities at the cell electrodes, that is, at the respective surfaces of the probe wall.

To express the measured cell E.M.F. E in terms of oxygen concentration it is necessary to assume that the solutions of oxygen in molten metal (in this case, in tin) obey Henry's law: the published data on the solubility of oxygen in tin can then be extrapolated to temperatures of the order of those encountered in a molten tin bath in glass manufacture (750° C. to 1100° C.) to give calibration curves from which oxygen concentration can be deduced.

For measurement of the oxygen concentration in the molten metal it is necessary to maintain a constant reference concentration of oxygen at the surface of the probe wall which is not in contact with the metal. This is conveniently done by continuously circulating air over this surface, for example through the tube 16.

An oxygen concentration measuring probe may be used in a control system for maintaining the oxygen concentration in a molten metal within predetermined limits automatically. Thus the E.M.F. provided by the concentration measuring probe may be used as a control signal for controlling both the magnitude and direction of the current passed through one or more walls or membranes in apparatus such as that described with reference to FIGS. 1 to 3 in order to maintain the oxygen concentration in the metal within a given range.

I claim:
1. A method of manufacturing float glass comprising: advancing glass in ribbon form along a bath of molten metal over which a protective atmosphere is maintained, and controlling the dissolved oxygen content of the molten metal bath by establishing an electrolytic cell with a solid state electrolyte comprising a wall of a refractory oxide which has a substantial oxygen ion conductivity, the molten metal of the bath constituting one electrode and being in contact with one surface of the wall, and another electrode being in electrical contact with the other surface of the wall, passing an electric current through the cell so that oxygen ions pass through the wall, and regulating the magnitude and direction of the current to control the oxygen content of the molten metal bath.

2. A method of manufacturing float glass according to claim 1 and further including establishing a second electrolytic cell with a solid state electrolyte comprising a wall of a refractory oxide which has a substantial oxygen ion conductivity, the molten metal of the bath constituting one electrode and being in contact with one surface of the wall and another electrode being in electrical contact with the other surface of the wall, maintaining a constant reference concentration of oxygen at said other surface of the wall, and measuring the cell E.M.F. between said electrode and the molten metal bath to produce an indication of the oxygen concentration in the molten metal of the bath, and employing that indication to regulate the current through the first-mentioned cell.

3. A method as claimed in claim 2, including continuously circulating air over said other surface of the wall of the second cell to maintain said constant reference concentration of oxygen.

4. In combination: a tank structure containing a bath of molten metal along which glass is advanced and apparatus for testing the content of dissolved oxygen in said molten metal bath comprising a probe having a wall formed of a refractory oxide with a substantial oxygen ion conductivity, one surface of the wall being adapted to contact the molten metal, an electrode making electrical contact with the other surface of the wall, means for maintaining a constant reference concentration of oxygen at said other surface of the probe wall, and means connectable between the electrode and the molten metal to measure the E.M.F. of the galvanic cell comprising said wall and electrode, which E.M.F. is indicative of the oxygen concentration in the molten metal bath.

5. Apparatus for manufacturing glass including a tank structure containing a bath molten metal along which glass is advanced, and means for controlling the content of dissolved oxygen in the molten metal bath, and comprising: a wall of a refractory oxide having a substantial oxygen ion conductivity, one surface of the wall being in contact with the molten metal, an electrode in electrical contact with the other surface of the wall, means for connecting the said electrode and the molten metal bath across a direct current power source, and means for regulating the current flow through the wall to control the oxygen content of the molten metal bath.

6. Apparatus according to claim 5, in which the electrode in electrical contact with the said other surface of the wall comprises a porous platinum layer.

7. Apparatus according to claim 5, in which the electrode in electrical contact with the said other surface of the wall includes a molten metal.

8. Apparatus according to claim 5, in which said electrode and the molten metal constitute the positive and negative electrodes respectively of an electrolytic cell, and means are provided for continuously removing oxygen liberated at said other surface of the wall.

9. Apparatus according to claim 8, in which said means for removing liberated oxygen from said other surface of the wall comprise means for directing a purging gas stream over said surface, to remove the oxygen by chemical combination or by entrainment.

10. Apparatus according to claim 8, in which said means for removing liberated oxygen from said other surface of the wall comprise means for directing a purging gas stream over the electrode in contact with that surface, to remove the oxygen by chemical combination or by entrainment.

11. Apparatus according to claim 9, in which said purging directing means includes hydrogen-directing means.

12. Apparatus according to claim 5, in which the wall is formed of zirconium oxide.

13. Apparatus according to claim 5, in which the wall comprises thorium including a proportion of up to 20% of an oxide selected from calcium oxide, magnesium oxide and yttrium oxide.

14. Apparatus according to claim 5 in which the tank structure is formed with a recess defining a pocket which communicates with the bath of molten metal, the refractory oxide wall being located in the pocket, and means being provided for circulating metal from said bath over one surface of the wall in said pocket and thence back to the bath.

15. Apparatus according to claim 14 in which said refractory oxide constitutes a part of the wall of a tank structure and separates the pocket from the bath.

16. Apparatus according to claim 15, wherein the wall separates the molten metal of said bath from a body of molten metal in contact with said other surface of the wall.

17. Apparatus according to claim 14, including an elongated tank structure containing the molten metal bath, means for advancing a ribbon of glass along the surface of the bath of molten metal, and a plurality of said pockets spaced-apart along a side wall of the tank structure in the direction of advance of the ribbon.

18. Apparatus according to claim 17, including means for controlling individually the voltage applied between the electrode and the molten metal in each said pocket.

19. Apparatus according to claim 5, in which the wall is in the form of a hollow body immersed in the molten metal.

20. Apparatus according to claim 19, for removing oxygen from the bath of molten metal, in which the wall is in the form of a tube closed at one end and disposed in a chamber, and means are provided for circulating molten metal from the bath through the chamber and back to the bath, the said electrode being in electrical contact with the internal surface of said tube.

21. Apparatus according to claim 20, including means for controlling the temperature of the molten metal before it is returned from the chamber to the bath.

22. Apparatus according to claim 5, including an electrode immersed in the molten metal for connecting the molten metal to the negative terminal of the direct current power source.

23. Apparatus according to claim 22, wherein said electrode is formed of rhenium.

References Cited

UNITED STATES PATENTS

| | | | |
|---|---|---|---|
| 3,330,635 | 7/1967 | Loukes et al. | 65—27 |
| 3,337,319 | 8/1967 | Edwards | 65—27 |
| 3,492,109 | 1/1970 | Simpson et al. | 65—99 A |
| 3,525,601 | 8/1970 | Ohsato | 65—27 X |

ARTHUR D. KELLOGG, Primary Examiner

U.S. Cl. X.R.

65—99 A, 32, 182 R